United States Patent [19]

Marko

[11] Patent Number: 5,862,800
[45] Date of Patent: Jan. 26, 1999

[54] MOLTEN NITRATE SALT SOLAR CENTRAL RECEIVER OF LOW CYCLE FATIGUE 625 ALLOY

[75] Inventor: Myroslaw Marko, Westlake Village, Calif.

[73] Assignee: Boeing North American, Inc., Seal Beach, Calif.

[21] Appl. No.: 723,233

[22] Filed: Sep. 27, 1996

[51] Int. Cl.[6] ........................................................ F24J 2/02
[52] U.S. Cl. .......................... 126/680; 126/651; 126/655; 126/663; 126/677
[58] Field of Search .................................. 126/680, 677, 126/663, 655, 651

[56] References Cited

U.S. PATENT DOCUMENTS

| | | | |
|---|---|---|---|
| 4,512,336 | 4/1985 | Wiener | 126/442 |
| 4,525,620 | 6/1985 | Deverell et al. | 219/137 WM |
| 4,714,498 | 12/1987 | Khare | 148/11.5 N |
| 4,765,956 | 8/1988 | Smith et al. | |
| 5,417,052 | 5/1995 | Bharathan et al. | 60/39.02 |

OTHER PUBLICATIONS

SAE AMS 5879A, Issued Jan. 1991, Revised Jan. 1996; Nickel Alloy, Corrosion and Heat Resistant, Sheet, Strip, and Foil 62Ni—21.5Cr—9.0Mo—3.7Cb, Cold Rolled and Annealed from Inco Alloys Tech.

Inco Alloys International technical information on INCONEL alloy 625LCF, Publication No. IAI–83–L.

High Temperature Optical Properties of Alloys for Central–Solar Receiver Solar Power Systems, Optical Sciences Center University of Arizona, Final Report to Doe Under Contract E(29–2)–3673 Apr. 1978, P. 9, H. S. Gurev, K. D. Masterson.

*Primary Examiner*—Larry Jones
*Attorney, Agent, or Firm*—Harry B. Field; Steven E. Kahm

[57] ABSTRACT

This invention provides a molten salt, solar central smooth tube receiver that is able to effectively absorb a peak solar flux of 1.42 $MW/M^2$ by constructing the receiver from low cycle fatigue 625 alloy. Although higher flux levels are attainable for a smooth tube receiver by reducing the tube diameter to increase the salt's heat transfer coefficient, the receiver's size is optimized at this flux level to minimize capital and performance costs. Analogously, material provides substantial performance and capital cost improvements for receivers constructed with internally enhanced film coefficient tubes. The receiver's cost is minimized by utilizing autogenously welded and drawn tubing with the weld located at the tube's neutral axis to provide minimal strain at the weld.

13 Claims, 2 Drawing Sheets

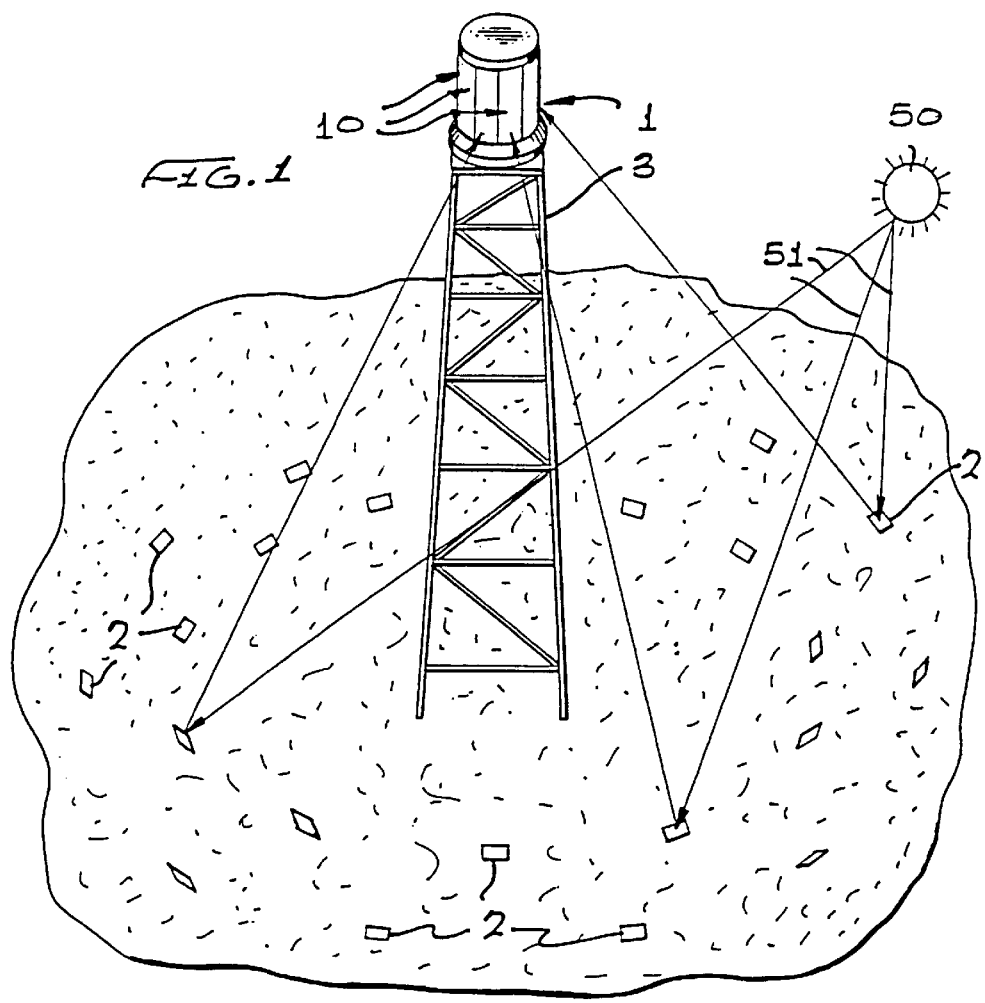
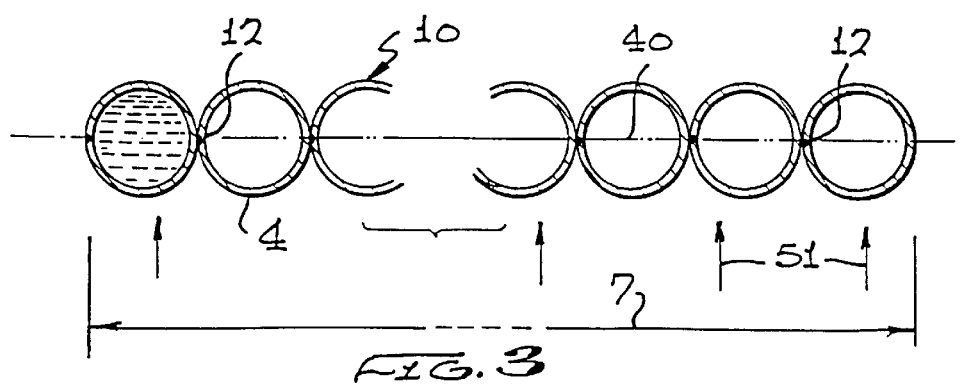

MOLTEN NITRATE SALT SOLAR CENTRAL RECEIVER OF LOW CYCLE FATIGUE 625 ALLOY

BACKGROUND OF THE INVENTION

1. Field of the Invention

This invention relates to materials of construction for a solar central receiver and more particularly to the use of low cycle fatigue 625 alloy as the material used to fabricate a solar central receiver containing high temperature sodium-potassium nitrate salt as the heat transport fluid.

2. Description of the Related Art

Presently, materials used to contain 565° C. sodium-potassium nitrate salt in solar central receiver applications include 304 and 316 austenitic stainless steels and Incoloy 800 nickel-iron-chromium alloy. This class of materials possesses: high coefficients of thermal expansion, low yield and creep strengths, low thermal conductivities, low thermal fatigue properties and are susceptible to chloride stress corrosion cracking. However, they do have; excellent salt corrosion resistant properties up to 600° C., excellent weldability and fabricability, and are acceptable to the ASME Boiler and Pressure Vessel Code.

When used in a molten nitrate salt, solar central receiver the construction material for the solar absorption panel tubes should be: resistant to the molten salt's strong oxidation properties, resistant to chloride stress corrosion cracking, economically fabricated, weldable, acceptable to the ASME Boiler and Pressure Vessel Code and table to withstand the severe thermal strains caused by the through wall and across diameter temperature gradients. These strains, which are directly proportional to the material's thermal expansion coefficient, set the receiver's size by restricting the absorbed solar flux to a value determined by the material's allowable fatigue strain level for the imposed number of daily sun and cloud cover cycles over the receivers lifetime.

Because a receiver's radiation and convection thermal losses are directly proportional to its area and temperature distribution, a smaller receiver with equivalent temperatures has lower thermal losses. However, because the light reflected by the solar plant's sun collection field (heliostats) onto the receiver more easily misses a smaller receiver its light spillage losses are greater. Still, the reduction in thermal losses off-sets the light spillage losses except for very small receivers. Also, smaller receivers designed to achieve their reduced size by improved material properties, such as; a lower coefficient of thermal expansion combined with a greater thermal fatigue strength have lower fluid flow pressure losses and reduced capital costs because they have fewer shorter tubes of a diameter like the lesser material's larger size receiver.

SUMMARY OF INVENTION

This invention uses low cycle fatigue 625 alloy construction material to provide the smallest, most reliable, efficient and economical molten nitrate salt, solar central receiver. The low cycle fatigue 625 alloy receiver is substantially smaller than one constructed from 304, 316 or Incoloy 800 because its smaller coefficient of thermal expansion, combined with its higher allowable thermal fatigue strain levels at higher metal temperatures, permits a significant increase in solar flux onto the receiver.

Low cycle fatigue 625 alloy possesses: excellent base metal and weldment resistance to corrosion from 605° C. molten sodium-potassium nitrate salt, high resistance to chloride stress corrosion cracking due to either impurities in the molten salt or externally derived chlorides from the atmosphere or thermal insulation, a low coefficient of thermal expansion, good thermal conductivity, excellent creep and yield strengths and outstanding mechanical and thermal fatigue resistance.

The solar central receiver is constructed by assembling a plurality of tubes arranged for parallel flow and made of low cycle fatigue 625 alloy to form a panel. Multiple panels are arranged for serpentine-series flow to form either a cavity, billboard or cylindrical surround field receiver on which reflected sunlight is focused by a plurality of heliostats.

OBJECTS OF THE INVENTION

It is an object of the invention to increase the solar heat flux absorptive capacity of a solar central receiver by using a material with high fatigue strength and low thermal expansion coefficient so as to reduce the receiver's size and thereby reduce it's cost.

It is an object of this invention to provide a material for containing molten sodium-potassium nitrate salt at 605° C.

It is a further object to provide a material with a low coefficient of thermal expansion.

It is yet another object to provide a material that is highly resistant to chloride stress corrosion cracking.

It is yet another object to provide a material with high thermal and mechanical fatigue resistance.

It is yet another object to provide a material with high yield and creep strengths.

It is still another object to provide a material with excellent weldability.

It is an object of this invention to provide the lowest cost, smallest, lowest pressure loss and most efficient smooth tube solar central receiver having an optimum heliostat field size that utilizes sodium-potassium nitrate salt for its heat transport fluid.

It is yet another object to provide a material that can be used to construct a cost effective internally enhanced film coefficient tube solar central receiver.

It is still another object to provide an autogenous welded and drawn tube to minimize cost and locate the weld out of the sun's flux to minimize strain at the weld location.

Other objects, advantages and novel features of the present invention will become apparent from the following detailed description of the invention when considered in conjunction with the accompanying drawings.

BRIEF DESCRIPTION OF THE DRAWINGS

FIG. 1 is a configuration sketch of a cylindrical, molten salt solar central receiver with a surround heliostat field.

FIG. 3 is a detailed cross section view of the panel's solar absorption tubes showing the autogenous tube weld location.

DETAILED DESCRIPTION OF THE PREFERRED EMBODIMENT

Figure 2:
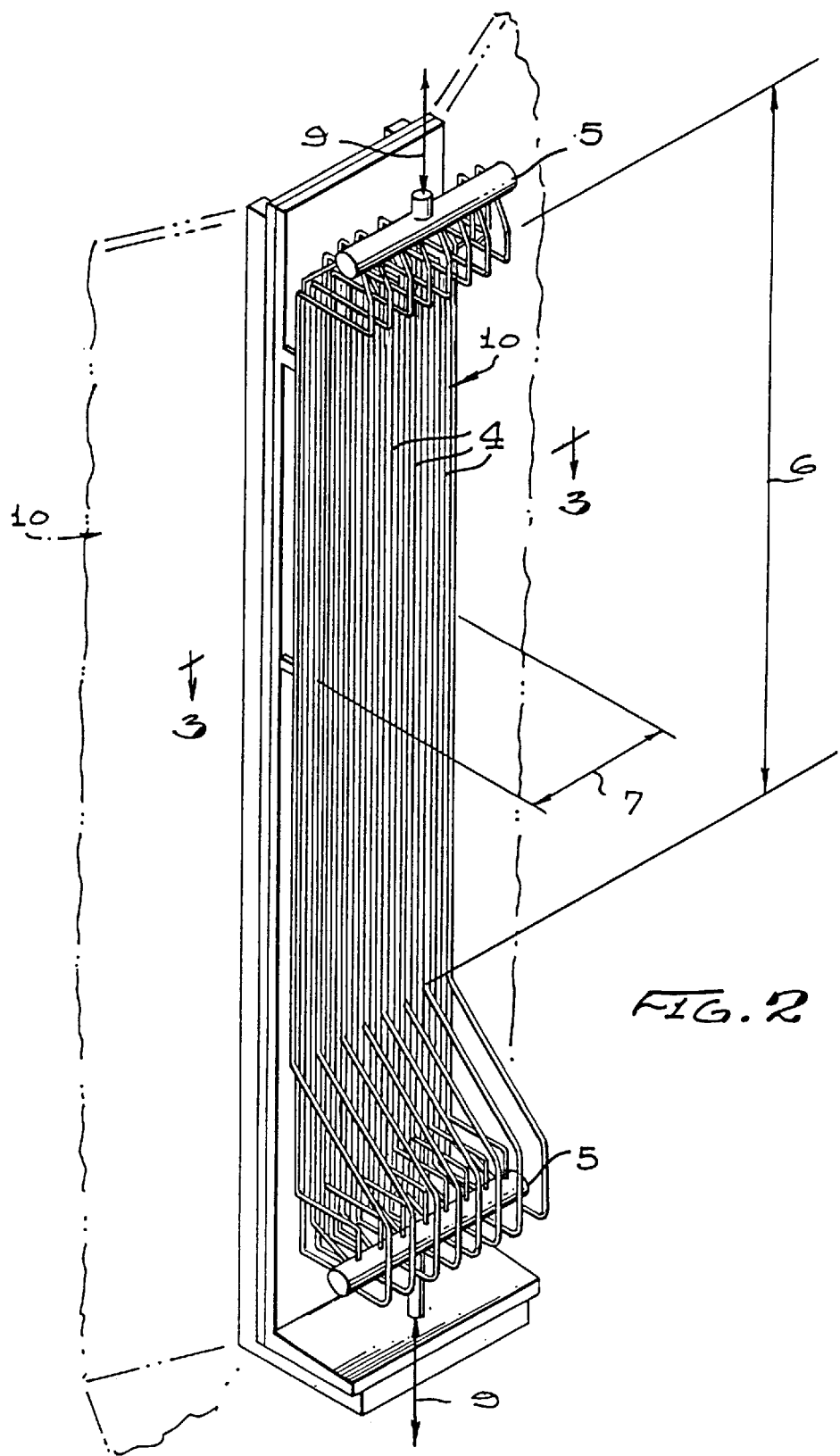
FIG. 2 is an isometric view of a typical molten salt, solar absorption panel.

This invention relates to materials used to contain the high temperature sodium-potassium nitrate salt heat transport fluid in solar central receivers. These receivers may be of the cavity, billboard or cylindrical, surround field type and are used to absorb solar radiation for the generation of thermal energy for process heat or steam generation for production of electric power.

FIG. 1 depicts a solar central cylindrical receiver 1 which is surrounded by a field of heliostats 2. The receiver 1 is mounted on a tower 3 to provide the most efficient focal point height. The receiver 1 is made up of molten salt solar absorption panels 10. The sun 50 provides solar rays 51 which shines on heliostats 2. The solar rays 51 are reflected by the heliostats 2 to the solar central cylindrical receiver 1. The molten salt solar absorption panels 10 are heated and the hot molten salt inside the panel tubes 4 transports the heat to equipment which may use the thermal energy for process heat or to generate electricity.

FIG. 2 shows a typical molten salt solar absorption panel 10 with its absorption tubes 4 which can be of seamless, welded or welded and drawn construction and headers 5. The molten salt flow 9 enters or exits the solar absorption panel 10 through its headers 5. The solar absorption area in panel 10 is the tube absorption length 6 by panel width 7. In this embodiment the receiver 1 is composed of multiple panels 10 arranged in two circuits, each with eight panels, having a serpentine flow path and forming a polyhedral, cylindrical surface.

In order to make this type of solar receiver more economical to build and operate, it is necessary to reduce the amount of material and fabrication operations used. This is accomplished by increasing the absorbed solar flux to reduce the solar absorption panel 10 size while producing the same power.

A solar absorption panel 10 fabricated from a low cycle fatigue 625 alloy as disclosed in U.S. Pat. No. 4,765,959 has increased solar flux, resulting in smaller panels. The U.S. Pat. No. 4,765,959 issued to Smith et al. and entitled "Nickel-Chromium Alloy of Improved Fatigue Strength" is incorporated by reference herein in its entirety. The low cycle fatigue 625 alloy is also described in UNS N06626, ASTM B 443, ASME SB-443, SAE AMS 5599, 5879, BS 3072 (NA21), and Werkstoff Nr. 2.4856, all of which are incorporated by reference in their entireties. In a preferred embodiment of the invention, the low cycle fatigue 625 alloy is obtained from INCO Alloys International, 3200 Riverside Drive, Huntington, W. Va. 25705, which sells it under the trademarks INCONEL alloy 625LCF. Compared to the chemical composition for standard 625 alloy, the carbon, silicon, and nitrogen contents are controlled at low levels to produce a microstructure that enhances low cycle fatigue strength. The compositional control, combined with vacuum induction melting and other processing, yields a dramatic increase in low cycle fatigue strength over the standard 625 alloy produced with usual chemical analyses and processing.

In an embodiment of the invention, the low cycle fatigue 625 alloy is characterized by (i) enhanced fatigue properties as well as (ii) tensile properties and (iii) structural stability. The low cycle fatigue 625 alloy consists essentially of 6 to 12% molybdenum, 19 to 27% chromium, 2 to 5% niobium, up to 8% tungsten, up to 0.6% aluminum, up to 0.6% titanium, carbon present in an amount up to 0.03%, nitrogen present up to 0.03%, silicon up to 0.35%. The carbon, nitrogen, and silicon being correlated such that the sum of %carbon+%nitrogen+1/10% silicon is less than about 0.035%. The low cycle fatigue 625 alloy has up to 5% iron, with the balance being nickel.

In an other embodiment of the invention, the low cycle fatigue 625 alloy is characterized by enhanced fatigue properties together with good tensile properties and structural stability consisting essentially of from 30 to 70% nickel, 12 to 30% chromium, up to 10% molybdenum, up to 8% tungsten, up to 15% cobalt, up to 5% niobium, and/or tantalum, titanium plug aluminum up to 5%. The low cycle fatigue 625 alloy having carbon, nitrogen present and silicon in correlated percentages such that the %carbon+ %nitrogen+1/10% silicon is less than about 0.04% to thereby improve low cycle and thermal fatigue strength. The balance of the low cycle fatigue 625 alloy being from 0 to 50% iron.

In another embodiment of the invention, the low cycle fatigue 625 alloy has limiting chemical compositions of nickel being a minimum of 58.0%, chromium being between 20.0 and 23.0%, molybdenum being between 8.0 and 10.0%, niobium plus tantalum being between 3.15 and 4.15%, Iron being a maximum of 5.0%, carbon being a maximum of 0.03%, silicon being a maximum of 0.15%, nitrogen at 0.02% maximum, manganese at 0.50% maximum, sulfur at 0.015% maximum, aluminum at 0.40% maximum, titanium at 0.40% maximum, phosphorous at 0.015% maximum, and cobalt at 1.0% maximum.

In another embodiment of the invention, the low cycle fatigue 625 alloy is defined by the AMS 5879 standard issued January 1991 and revised January 1996, which is incorporated herein in its entirety. The AMS 5879 standard states that the composition of the low cycle fatigue 625 alloy has a composition of a maximum of 0.03% of carbon, 0.50% of manganese; 0.15% silicon; 0.015% of phosphorus, 0.015% of sulfur, 1.00% of cobalt, 0.40% of titanium, 0.05% of tantalum, 0.40% of aluminum, 5.00% of iron, 0.02% of nitrogen; a range of 20.00% to 23.00% of chromium, 8.00 to 10.00% of molybdenum, and 3.15 to 4.15% of columbium; and the remainder being nickel. The standard also states that the

[a]lloy shall be multiple melted using consumable electrode practice in the remelt cycle. If consumable electrode remelting is not performed in vacuum, electrodes which have been produced by vacuum induction shall be used for remelting.

The standard further states that product [made from the alloy] shall be annealed by heating to a temperature not lower than 1600° F. (871° C.), holding the selected temperature within +25° F. (±14° C.) for a time commensurate with section thickness, and cooling at a rate equivalent to an air cool or faster. The use of disassociated ammonia atmosphere is prohibited.

As for the properties of the material, the standard states that for product of 0.100 inch (25.4 mm) and under in nominal thickness that the tensile strength shall be 120 ksi (827 MPA), the yield strength at 0.2% offset is 60.0 ksi (414 MPa), and the elongation in 2 inches (50.8 mm) is 40% (with the yield strength not applying to product under 0.010 inch (0.25 mm) in nominal thickness and the elongation requirements not applying to product under 0.005 inch (0.13 mm) in nominal thickness). Products made of the alloy shall withstand, without cracking, bending at room temperature in accordance with ASTM E 290 though an angle of 180 degrees around a diameter equal to the nominal thickness times a bend factor. For product with a nominal thickness of up to 0.050 inch (up to 127 mm), the bend factor is 1, while the bend factor is 2 for nominal thicknesses of 0.050 to 0.100 inch (1.27 to 2.54 mm). The axis of the bend is parallel to the direction of the rolling. The average grain size of the alloy is a function of the product thickness. For product having a thickness of up to 0.010 inch (up to 0.25 mm), the maximum average grain size is ASTM Grain Size No. 8. For product having a thickness of 0.010 to 0.050 inch (0.25 to 1.27 mm), the maximum average grain size is ASTM Grain Size No. 6. For product having a thickness of 0.050 to 0.100 inch (1.27 to 2.54 mm), the maximum average grain size is ASTM Grain Size No. 5. In the preferred embodiment of the invention, the tubes 4 of the panel are thin wall tubes having a wall thickness of 0.049 inches and an average grain size range of ASTM Grain Size No. 7 to 9.

As demonstrated in Table 1, the low cycle fatigue 625 alloy sold under the INCONEL alloy 625LCF trademarks is superior to other materials such as stainless steel 316 for use in solar receivers. The size and performance improvements are due to the relatively superior physical, thermal, and mechanical properties of the low cycle fatigue 625 alloy. The most salient properties of the low cycle fatigue 625 alloy are its low coefficient of thermal expansion and high thermal and mechanical fatigue resistance, combined with its high yield and creep strengths. The low cycle fatigue 625 alloy is highly resistant to corrosion by sodium-potassium nitrate molten salt at 605 degrees centigrade and chloride stress corrosion cracking, and is acceptable to the ASME Boiler and Pressure Vessel Code.

A peak absorbed solar flux greater than the 1.42 MW/M$^2$ for the smooth tube panel shown in Table 1 is achievable by decreasing the tube diameter to increase the salt's heat transfer coefficient (which effectively decreases the across tube diameter temperature difference, hence tube thermal strain) or reducing the tube wall thickness below 0.049 inches to decrease the through wall thermal gradient, hence tube thermal strain. Because the selected wall thickness of 0.049 inches is set by the requirement to obtain reliable butt and tube wall attachment welds this approach cannot be used, while reducing the tube diameter results in increased pumping power costs due to larger pressure losses and increased receiver fabrication costs due to the larger number of smaller diameter tubes required.

TABLE 1

INCONEL ALLOY 625 LCF ® MATERIAL YIELDS SIZE AND PERFORMANCE IMPROVEMENTS FOR A SURROUND FIELD MOLTEN SALT, SOLAR CENTRAL CYLINDRICAL SMOOTH TUBE RECEIVER RATED AT 468 MW (T).

| Material | 316 | 625 LCF ® |
|---|---|---|
| Receiver Area (M$^2$) | 956 | 648 |
| Pressure Loss (PSID) | 262 | 228 |
| Efficiency (%) | 89.2 | 90.2 |
| Highest Power Panel | | |
| Average Absorbed Heat Flux (MW/M$^2$) | .786 | 1.15 |
| Peak Absorbed Heat Flux (MW/M$^2$) | .977 | 1.42 |
| Average Incident Flux (MW/M$^2$) | .55 | .80 |
| Absorption Panel Length (Ft) | 59.6 | 47.1 |
| Tube, OD (in.) | 1.375 | 1.500 |
| wall thickness (in.) | 0.049 | 0.049 |
| Number of Tubes | 94 | 74 |
| width (feet) | 10.77 | 9.25 |
| Number of panels/flow circuit | 8 | |
| Number of flow circuits | 2 | |
| Salt Temperature, | | |
| Inlet (°F.) | 550 | |
| Outlet (°F.) | 1050 | |

Analogously, low cycle fatigue 625 alloy can be used to construct internally enhanced film coefficient tubes in lieu of smaller diameter smooth tubes to provide a greater peak absorbed solar flux with its commensurate cost benefits.

Because minimum system cost is the key criterion for the successful development of a commercially viable solar power plant, the values shown in Table 1 are based on a receiver flux distribution which is optimized to provide the lowest cost receiver/heliostat field combination.

FIG. 3 shows the location of the autogenous weld 12 on the neutral axis 40 of assembly tubes 4 to provide the lowest strain in the weld. By assembling a plurality of tubes 4 made of low cycle fatigue 625 alloy a solar panel 10 of width 7 can be fabricated.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A solar central receiver panel for transferring solar energy into a molten salt flow comprising a plurality of assembled low cycle fatigue 625 alloy tubes of equal diameter and wall thickness.

2. The solar central receiver panel of claim 1, wherein at least a portion of the assembled tubes are of seamless construction.

3. The solar central receiver panel of claim 1, wherein at least a portion of the assembled tubes are of autogenously welded construction.

4. The solar central receiver panel of claim 3, wherein at least a portion of the assembled tubes have a weld located on a neutral axis of the tubes.

5. The solar central receiver panel of claim 3, wherein at least a portion of the assembled tubes are of autogenously welded and drawn construction.

6. The solar central receiver panel of claim 5, wherein at least a portion of the assembled tubes have a weld located on a neutral axis of the tubes.

7. A process for heating molten nitrate salt comprising the step of directing a flow of molten nitrate salt through a plurality of assembled tubes in a solar central receiver panel, wherein at least a portion of the assembled tubes being comprised of low cycle fatigue 625 alloy and at least partially exposed to sunlight.

8. A method of fabricating a solar central receiver panel comprising the step of assembling a plurality of low cycle fatigue 625 alloy tubes of equal diameter and wall thickness arranged for parallel molten salt flow to form a panel for receiving solar energy.

9. The method of claim 8, further comprising the step of fabricating the low cycle fatigue 625 alloy tubes with autogenously welded and drawn construction having the weld located on a neutral axis of at least a portion of the assembled tubes.

10. The method of claim 9, further comprising the step of fabricating the low cycle fatigue 625 alloy tubes with autogenously welded construction having the weld located on a neutral axis of at least a portion of the assembled tubes.

11. A solar panel manufactured by the method of claim 8.

12. A solar panel manufactured by the method of claim 9.

13. A solar panel manufactured by the method of claim 10.

* * * * *